UNITED STATES PATENT OFFICE.

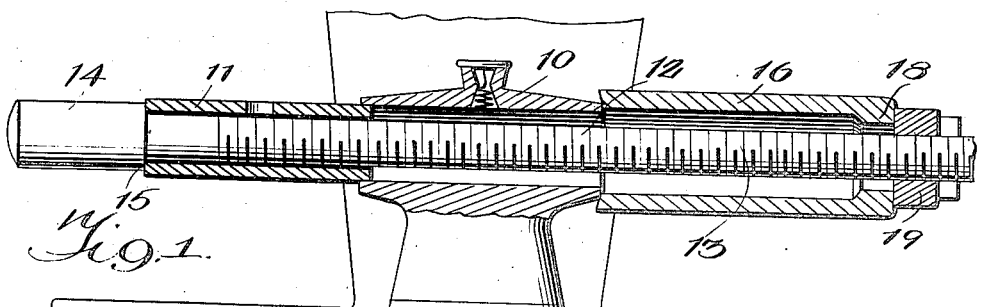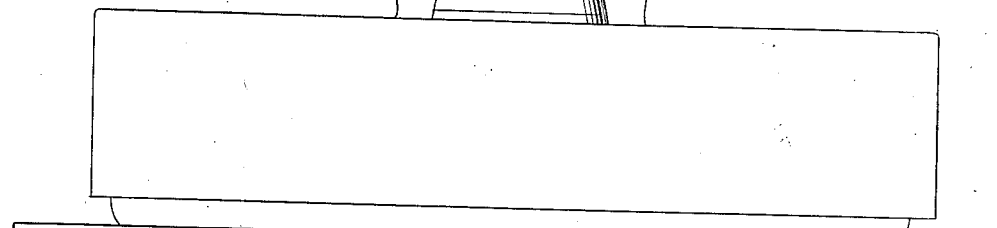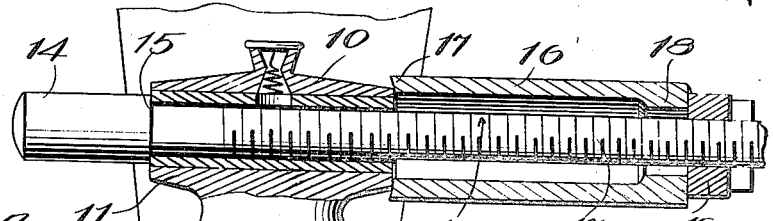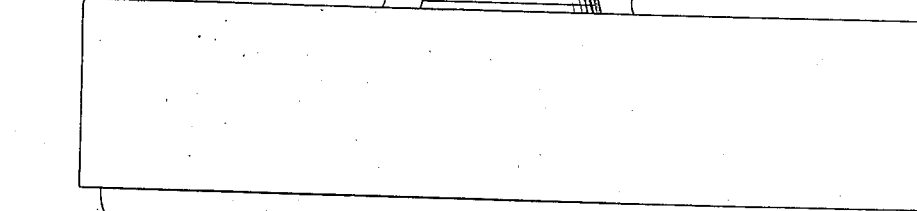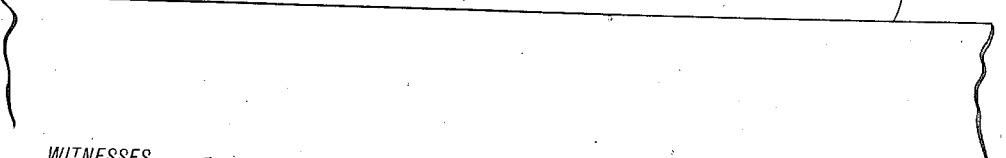

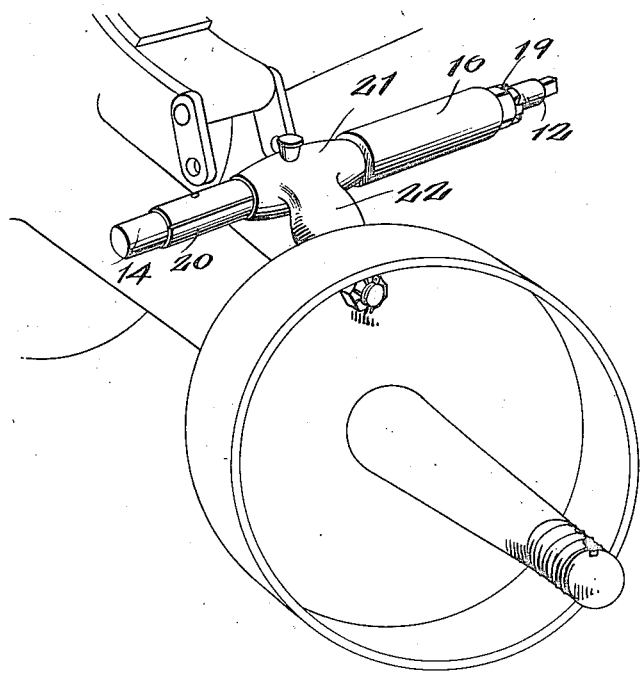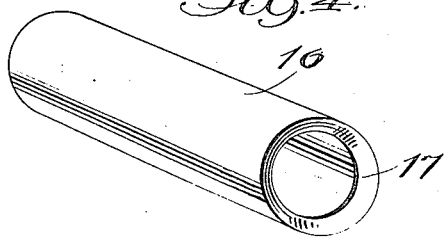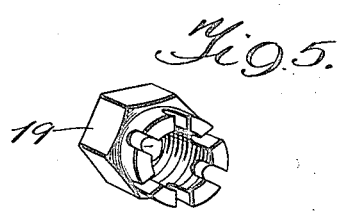

OTTO F. TIMM, OF WILSONCREEK, WASHINGTON.

BUSHING INSERTER OR REMOVER.

1,422,390.   Specification of Letters Patent.   Patented July 11, 1922.

Application filed April 8, 1921. Serial No. 459,674.

*To all whom it may concern:*

Be it known that I, OTTO F. TIMM, a citizen of the United States, and a resident of Wilsoncreek, in the county of Grant and State of Washington, have invented certain new and useful Improvements in Bushing Inserters or Removers, of which the following is a specification.

The present invention relates to bushing inserters and removers for use with machine bearings or the like, and has for its object to provide a device of this character which is of simple and durable construction, reliable in operation and easy and inexpensive to manufacture, which is effective to speedily insert or remove the bushing without distorting or otherwise injuring it, and without impairing the machine element, bearing or the like with which it is associated and which is capable in some instances of carrying out these operations without disassembling or removing the machine element from the other elements with which it is associated.

Other objects and advantages of the invention reside in certain novel features of construction, combination and arrangement of parts which will be hereinafter more fully described and particularly pointed out in the appended claim, reference being had to the accompanying drawings forming part of this specification, and in which:

Figure 1 is a plan view, partly in elevation and partly in transverse section, showing the invention in the initial phase of the bushing inserting operation;

Figure 2 is a similar view, showing the parts in the position in which they assume in the final phase of the bushing inserting operation or in initial phase of the bushing removing operation;

Figure 3 is a detail view in side elevation of the screw shaft and the head connected thereto;

Figure 4 is a detail perspective view of the abutment sleeve;

Figure 5 is a detail perspective view of the operating nut; and

Figure 6 is a perspective view illustrating the invention in use with the spring perch of a vehicle.

Referring to the drawings wherein for the sake of illustration is shown the preferred embodiment of the invention, the numeral 10 designates the machine element, bearing or the like into which or from which the bearing 11 is to be inserted or removed, respectively.

A shaft 12 is provided and adapted to be inserted through the bushing. The shaft is threaded for the major portion of its periphery, as at 13. At one end the shaft 12 carries a head 14 which is integrally formed or otherwise connected therewith. The head 14 presents an annular shoulder 15 engageable with one end of the bushing and which constitutes means for engaging the bushing.

As shown in the drawings, the shaft 12 is of sufficient length to extend entirely through the bushing of the bearing, machine element or the like with which it is associated and to project therethrough for a substantial distance. An abutment sleeve 16 is arranged on the projecting portion of the shaft and has one end beveled, as at 17, whereby it is adapted for engagement with the adjacent end of the bearing 10. At its opposite end the sleeve 16 is provided with an inwardly extending annular flange 18 having one of its lateral faces coplanar with the end of the flange and constituting a seat.

A nut designated at 19 is engaged with the threaded portion of the shaft and rotatably abuts the seat constituted by the flange 18 and the end of the abutment sleeve. It is obvious that the nut 19 and the threaded portion of the shaft constitute operating mechanism for imparting the requisite movement to the shaft 12 and consequently to the head 14. The shaft 12 at the end opposite the head 14 is provided with a squared portion $12^a$ and with a transverse opening $12^b$ whereby it may be held from turning.

In Figure 6 the invention herein above described is shown in use in inserting a bushing, designated at 20, in the bearing 21 of the spring perch 22 of the running gear of a motor vehicle or the like. As shown in this figure, it is only necessary in this instance to disconnect the shackle bolt and shackle links from the spring perch in order to carry out the operation, and it is not necessary to disassemble the spring perch from the brake drum upon which it is carried.

In practice, when it is desired to insert a bushing in the bearing, the bushing is first placed upon the shaft 12 and slid therealong until it engages the shoulder 15 of the head 14. The shaft is then extended through the bearing and the bushing thereon is placed immediate to the bearing. The abutment sleeve 16 is then arranged on the shaft with its beveled face 17 engaging the bearings and the nut 19 is threaded on the shaft until it engages the seat presented by the abutment sleeve. Thereafter the nut is rotated by a suitable tool and the shaft 12 is held against turning by means of a suitable tool cooperating with the squared portion 12$^a$ or opening 12$^b$. As the nut is turned it cooperates with the threads 13 of the shaft 12 to impart movement thereto and as the shaft is held against turning this movement is rectilinear and longitudinally of the bearing. As the shaft moves longitudinally it carries with it the bushing for the head 14 which is rigidly connected with the shaft, engages the bushing and constrains it to the motion of the shaft. Thus the bushing is easily and speedily inserted in its bearing and it is not subjected to any strains tending to distort or impair it. When it is desired to remove the bushing the shaft 12 is extended through the bushing until the head 14 abuts one end thereof. The abutment sleeve is then arranged on the shaft with its beveled end 17 engaging the bearing and the nut 19 is threaded on the shaft until it engages the seat of the abutment sleeve. The nut is then turned and the shaft is held against turning. This moves the head 14 through the bearing and the head carries with it the bushing. As the bushing is removed it is received in the cavity defined by the sleeve which thus accommodates this movement.

It is obvious that the invention has a universal range of advantageous use and although especially adapted for use with automobiles, trucks and tractors it finds almost an equal application to all other machinery, machine elements, journals, bearings or the like and in a large number of instances the bushings may be inserted or removed without disassembling the machine. This latter is particularly true with respect to the bushings of spring eyes, radius rods, steering rods and the like.

It is to be understood that the invention is preferably made up in sets similar to the sets of drills, reamers or the like.

While I have shown and described the preferred embodiments of my invention, it is to be understood that various changes in the size, construction and arrangement of parts may be resorted to without departing from the spirit of my invention or the scope of the subjoined claim.

I claim:

In a device for inserting and removing bushings from machine elements, bearings or the like, a shaft having a portion of its periphery threaded and adapted to be extended through the bushing operated upon, a head integral with the shaft at one end thereof and comprising an annular shoulder engageable with one end of the bushing, a sleeve arranged on the shaft and having one end beveled to adapt it for engagement with the machine element and having an inwardly extending annular flange at its opposite end adapted with the end of the sleeve to constitute a seat, and a nut engaging the threads of the shaft and abutting the seat of the sleeve, said shaft having its end opposite from the head squared and having a transverse opening adjacent said squared portion whereby it may be held from turning.

OTTO F. TIMM.